United States Patent
Zappador et al.

(12) 
(10) Patent No.: US 6,325,053 B1
(45) Date of Patent: Dec. 4, 2001

(54) INTAKE SYSTEM FOR AN INTERNAL COMBUSTION ENGINE

(75) Inventors: Paolo Zappador, Turin (IT); John J. Purcell, Marlow; Paul Sowerby, Great Missenden, both of (GB)

(73) Assignees: Cummins Engine Company Ltd., Darlington; Iveco (UK) Ltd., Watford; New Holland U.K. Ltd., Basildon, all of (GB)

( * ) Notice: Subject to any disclaimer, the term of this patent is extended or adjusted under 35 U.S.C. 154(b) by 0 days.

(21) Appl. No.: 09/343,138

(22) Filed: Jun. 29, 1999

(30) Foreign Application Priority Data

Jun. 30, 1998 (GB) .................................... 9814083

(51) Int. Cl.⁷ .................................... F02M 35/10
(52) U.S. Cl. ...................... 123/549; 123/556; 123/184.47
(58) Field of Search ............... 123/556, 184.29, 123/184.34, 184.42, 184.47, 549, 543

(56) References Cited

U.S. PATENT DOCUMENTS

| 1,247,992 | 11/1917 | Nickum . |
|---|---|---|
| 1,344,242 | 6/1920 | Newell . |
| 2,177,840 | 10/1939 | Roualet . |
| 4,020,815 | 5/1977 | Hubert . |
| 4,379,443 | 4/1983 | Granger . |
| 4,685,437 | 8/1987 | Tanaka . |
| 5,551,387 | * 9/1996 | Carter et al. ............... 123/184.47 |
| 5,595,164 | 1/1997 | Thimmesch . |
| 5,743,242 | 4/1998 | Thimmesch . |

FOREIGN PATENT DOCUMENTS

| 61848 | 3/1982 | (EP) . |
|---|---|---|
| 783076A1 | 12/1996 | (EP) . |
| 1353255 | 1/1972 | (GB) . |
| 1537162 | 3/1976 | (GB) . |
| 2306570A | 9/1996 | (GB) . |

* cited by examiner

Primary Examiner—Marguerite McMahon
(74) Attorney, Agent, or Firm—Gary M. Gron

(57) ABSTRACT

An intake system for a multi-cylinder internal combustion engine, comprises an intake manifold 18 having a plenum chamber 20 common to a plurality of engine cylinders and an intake pipe 22 opening into the plenum chamber to supply ambient air to the plenum chamber. An electric heater 26 is located within the plenum chamber 20 in the path of at least part of the air entering the plenum chamber from the intake pipe 22.

14 Claims, 2 Drawing Sheets

INTAKE SYSTEM FOR AN INTERNAL COMBUSTION ENGINE

FIELD OF THE INVENTION

The present invention relates to an air intake system for an internal combustion engine.

BACKGROUND OF THE INVENTION

The inclusion of a heater in the air intake system of a compression ignition internal combustion engine is very beneficial in reducing cold start time and white smoke especially during operation under cold ambient conditions. However, the positioning of a heater in the air intake system tends to present packaging problems in that it can interfere with other components and it tends to add height to the engine assembly above the intake manifold. In addition, depending upon the location of the heater in the air intake system, the heater may develop hot spots, thereby reducing its reliability. U.S. Pat. No. 5,595,164 to Thimmesch, FIG. 1, is an example of unequal distribution of air causing portions of an elongated heating element 26 in line with inlet 102 to be less hot than the end portions of element 26 which are spaced from inlet 102. As a result, the useful life of elongated heating element 26 is reduced due to overheating of its ends.

SUMMARY OF THE INVENTION

With a view to mitigating, if not eliminating, the foregoing disadvantages, the present invention provides an intake system for a multi-cylinder internal combustion engine, comprising an intake manifold defining a plenum chamber connectable to a plurality of engine cylinders and an intake duct opening into and supplying ambient air to the plenum chamber and a heater comprising heating element means positioned within the plenum chamber in the path of at least a substantial part of the air entering the plenum chamber from the intake duct.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
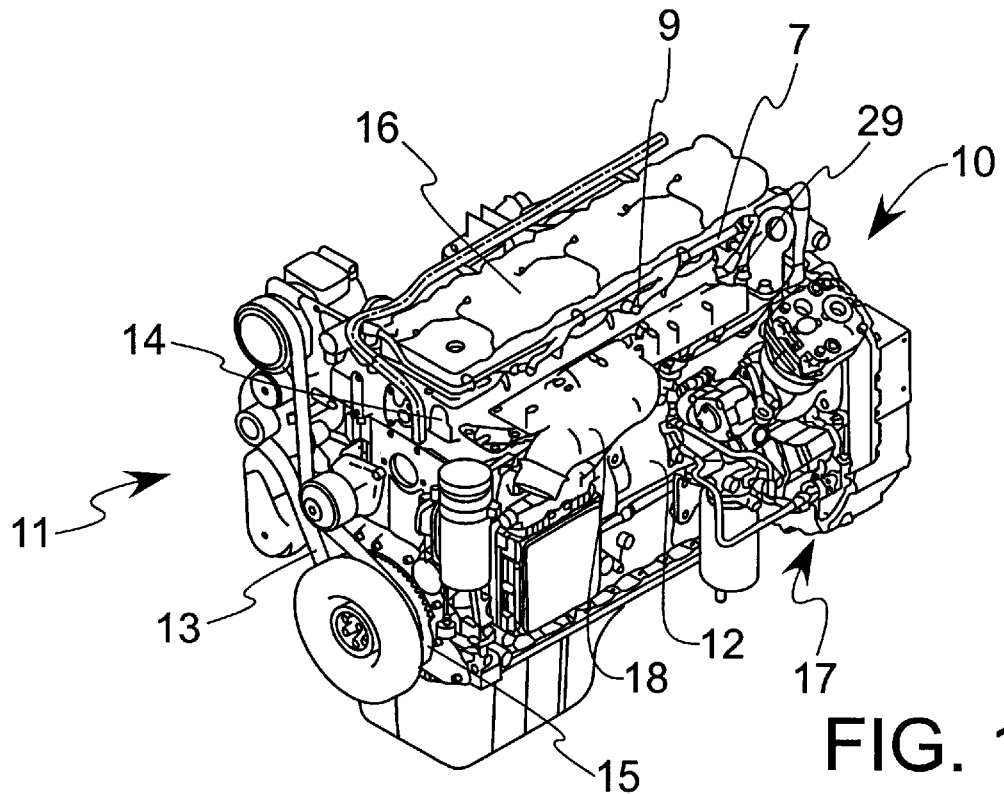
FIG. 1 is a schematic representation of an engine fitted with an intake system embodying the present invention.

FIG. 1 shows a multi-cylinder reciprocating diesel engine 10 comprising a cylinder bloc 12, a cylinder head 14 and rocker cover 16. An intake manifold 18 of the invention is bolted directly onto the cylinder head 14 to overlie the intake ports. Fuel lines 7 run along side head 14 with injectors 9 to supply metered fuel to engine 10 for combustion. On the other side of he engine, an exhaust manifold (not seen in the drawing) communicates with the exhaust ports. The engine may be of conventional design and does not therefore need to be described herein in detail.

Engine 10 additionally incorporates belt driven accessories, generally indicated at 11, driven by a common belt 13, which in turn is connected to an engine crankshaft pulley 15. A further group of accessories, generally indicated at 17, are driven by gearing (not shown) from the engine crankshaft (also not shown). The accessories 11 and 17 add to other external engine components to significantly increase the bulk of the engine 10 beyond that of the block 12, head 14, and valve cover 16.

To assist in starting the engine 10 it is known to heat the intake air, as shown by the prior art, by placing a heater 14 between the intake manifold 18 and the engine cylinder head. Such a heater however has many disadvantages, as mentioned above because it has to be crowded in with the rest of the bulk generating accessories. In accordance with the present invention, a compact and effective heater is provided within the plenum chamber of the intake manifold 18 as will now be described by reference to FIGS. 2–4.

Figure 2:
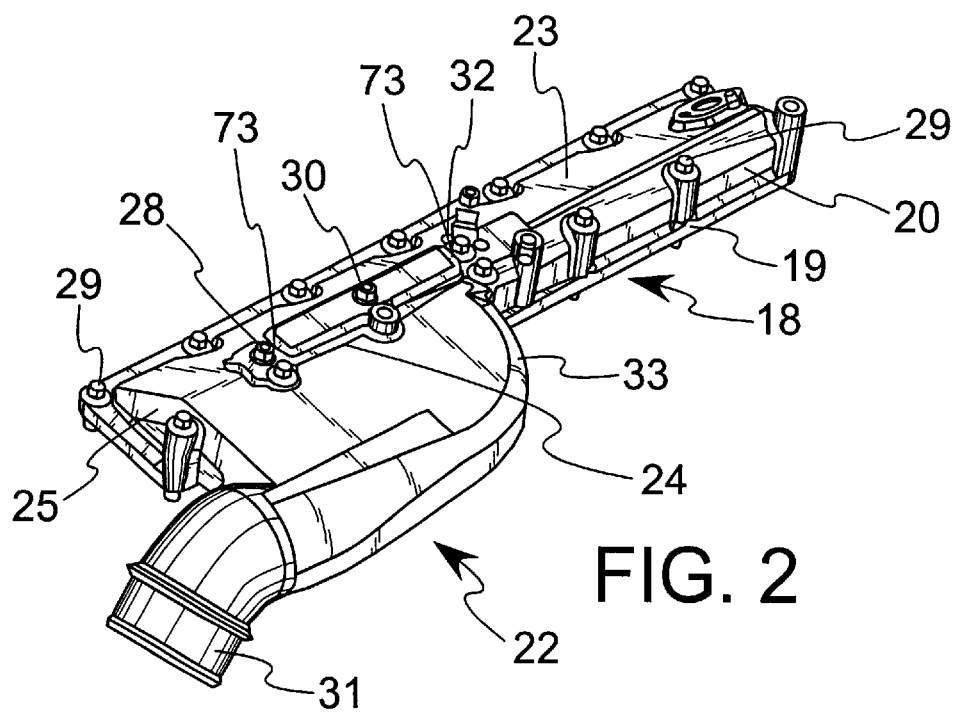
FIG. 2 is a perspective view from the exterior side of an intake manifold of the intake system of the invention.
Figure 3:
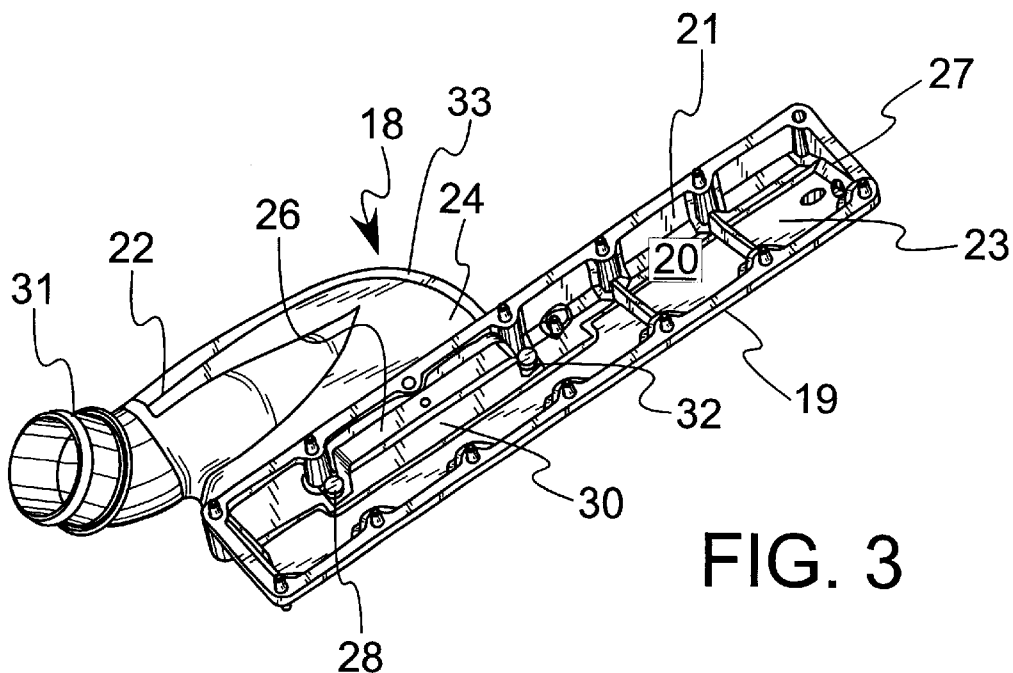
FIG. 3 is a perspective view of the intake manifold of FIG. 2 as seen from the interior side and showing a heater located within the plenum chamber of the manifold.

Referring particularly to FIGS. 2 & 3, the manifold 18 is an aluminum casting comprising perimeter flange 19 and an integral elongated side wall 21 which projects from the plane of perimeter flange 19 on one side. An integral top wall 23 extends between and connects the side wall 21 with the opposite side of flange 19. Integral triangular end walls 25 & 27 cover the ends to define an elongated plenum chamber 20. The length of the plenum chamber 20 of the manifold 18 is sized to overlie the intake ports of substantially all engine cylinders. As seen especially in FIG. 1, the intake manifold 18 is arranged on the engine head 14 and fastened to it by capscrews 29 so that the top wall 23 slopes downward toward the enter of the engine 10. This allows clearance for fuel lines 7 and injectors 9. At the same time, the projecting side wall 21 provides adequate height to allow a smooth transition of air flow from the intake duct 22 to the intake manifold 18.

The intake duct 22 is shown as an integral portion of the intake manifold 18. It should be apparent to those skilled in the art that the intake duct 22 may be provided as a separate component secured to the intake manifold 18. Intake duct has an upstream generally tubular inlet portion 31. Inlet portion 31 is connected to an appropriate conduit (not shown) which is connected to an air filter, turbocharger, or aftercooler, as appropriate. Inlet portion 31 leads to a transition section 33 to turn the air flow approximately 90 degrees and change the cross sectional flow area from circular to a rectangular outlet 24 (see FIG. 2 especially) having its short dimension just less than the height of projecting side wall 21 and its long dimension approximately the length of one half of the intake manifold 18 thus extending, in the illustrated embodiment, over the intake ports of three of the engine cylinders.

Heating element 26 is secured within the plenum chamber 20 substantially in the path of the intake air and extends over approximately two thirds of the width of the inlet 24 of the intake duct 22. The heater 26 does not extend over the entire mouth 24 of the intake pipe 22 because it is designed for use with both four-cylinder and six-cylinder engines. When used in a four-cylinder engine, the heater would extend across the entire outlet of an intake duct. As seen especially in FIG. 3 showing a 6 cylinder engine 10, the heating element 26 is strategically positioned to have a uniform distribution of air passing into intake plenum 20. This is because the inertia of the air making the approximately 90 degree transition from the inlet portion 31 to the outlet 24 causes it to flow preferentially toward the far end of the inlet 24. It should also be noted that the heating element 26, unlike the prior art elongated elements, is compact and receives a substantial portion of the air entering the intake plenum 20.

Figure 4:
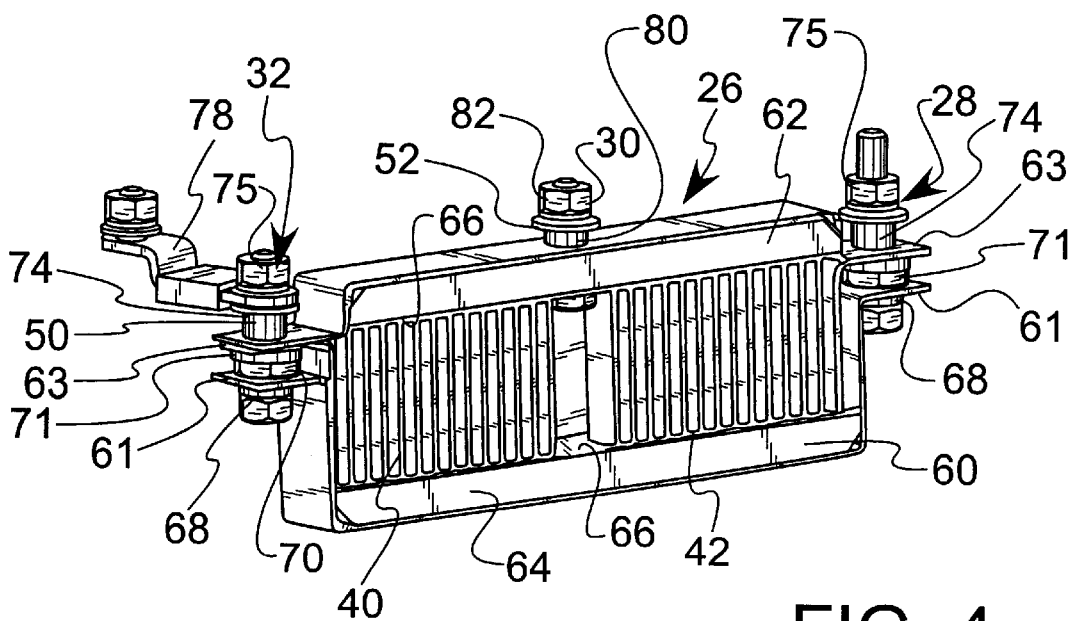
FIG. 4 is a perspective view of the heater shown in FIG. 3.

The heating element 26 as will now be described by reference to FIG. 4, is an electric heater having two ribbon like resistance elements 40, 42, mounted so that air flow passes smoothly on both of their side walls. Resistance element 40 is formed in a convoluted shape to form a plurality of parallel flow paths as shown in FIG. 4. Element 42 is formed in a similar fashion. Elements 40 and 42 are retained within a pair of formed housings 60 and 62, each having projecting mounting flanges 61 and 63, respectively. Screws 32 and 28 extend through mounting flanges 61 and 63 to hold housings 60 and 62 together. Housings 60 and 62 have side wall pairs 64, 66, respectively which retain resistance elements 40 and 42 in place. Suitable electrical insulating elements 66 are provided within housings 60 and 62 to maintain resistance elements 40, 42 out of contact with the housings. The insulating elements 66 have a series of recesses (not shown) which receive the convolutions of the resistance elements 40 and 42. In order to electrically insulate screws 32 and 28 from the mounting flanges 61 of housing 60, a pair of insulating washers 68, 70 are provided over the respective screws on opposite sides of mounting tabs 6. An insulating sleeve (not shown), either in separate form or integral with one of the two insulating washers 68, 70, extends axially between the outer diameter of screws 32 and 28 and the edges of mounting flange 61.

Nuts 71 are threaded on screws 32 and 28 to sandwich flanges 61. The nuts 71 abut and electrically contact the ends of resistance elements 40 and 2. The electrical insulation from housing 62 takes place in a similar fashion by means of insulating washers 72 and an elongated electrically insulating tubular element 74 extending over screws 32 and 28. The tubular elements 74 have a reduced diameter portion (not shown) which extends through mounting flanges 63 to insulate them from screws 32 and 28. The tubular insulating elements 74 have an axial length equal to the thickness of intake manifold 18 so that when screws 28, 32 extend through appropriate holes adjacent the outlet 24 of the intake duct 22, as shown in FIGS. 2 and 3, they are electrically insulated from it. Insulating washers 13 are positioned over screws 32 and 28 and against the outside of intake manifold 18. Nuts 75 are threaded over screws 32 and 28 to hold the heating element 26 in place. An electrically conductive strap 78 is positioned over screw 32 and held in place by nut 75. Strap 78 provides connection to a source of electric power and screw 28 provides a connection to the other part of the electrical power.

As illustrated, resistance elements 40, 42 are electrically joined by a screw 30 which is electrically insulated from housing 62 by insulating elements including a tubular element 80 having an axial length equal to the thickness of intake manifold so that when screw 30 extends through an appropriate hole between the holes for screws 28, it is also electrically insulated from the intake manifold 18. An electrically insulating washer 52 is provided between nut 82 and intake manifold 18.

The provision of such a heater with a center electrical tap through screw 30 allows the same heater to be used with a 12V and a 24V supply. In the case of a 24V supply, the supply voltage is merely applied across the screws 28 and 32 whereas in the case of a 12V supply the screw 30 is connected to one terminal of the power supply and the screws 28 and 32 are connected to the other terminal.

In use, electrical power is supplied to the heater 26 during cold starts. The heat generated by the heater 26 is used mostly in heating the intake air with little heat being lost by conduction. Furthermore, after the air has been heated, it enters the engine cylinders directly and none of its heat is lost. Thus, the electrical energy is used efficiently.

The present invention offers the advantage that because the heater is located with the plenum chamber 20 of the intake manifold 18, it is close to the engine intake ports and the heated air is not significantly cooled before reaching the engine cylinders. In addition, because of its location at the outlet 24 of the intake duct 22, most if not all of the intake air is exposed to the heater for peak energy transfer at reduced heater temperatures.

The intake system of the invention also improves packaging by not requiring an externally added-on heater assembly. Instead, the heater is housed within the plenum chamber 20 of the intake manifold 18 and therefore takes up little or no additional space. By not requiring a separate housing and gasket for the heater, the intake system of the invention reduces costs and also eliminates the risk of unmetered and unfiltered air entering the intake manifold engine through a badly sealed heater block.

The sloping wall 23 of the intake manifold 18 allows proper clearance for the fuel lines 7 and injectors 9 while the side wall 21 allows an appropriate height for the intake duct 22.

What is claimed is:

1. An intake system for a multi-cylinder internal combustion engine, comprising an intake manifold defining a plenum chamber connectable to a plurality of engine cylinders and an intake duct opening into and supplying ambient air to the plenum chamber, and a heater comprising heating element means positioned within the plenum chamber adjacent to and in the path of at least a substantial part of the air entering the plenum chamber from the intake duct, said engine having at least a portion of its cylinders in-line with one another and wherein said intake manifold is elongated to overlie substantially all of the in-line cylinders and said intake duct is at one end of said elongated intake manifold, said intake manifold comprising an elongated side wall having its width extending out of a common plane for said intake manifold, an elongated top wall having one side edge connected along said side wall and the other side edge extending to said common plane, and a pair of generally triangular end walls extending between said top and side walls to said common plane.

2. An intake system as claimed in claim 1 wherein said intake duct connects to one end of said side wall.

3. An intake system as claimed in claim 2 wherein said intake manifold further comprises a perimeter mounting flange substantially positioned in said common plane.

4. An intake system as claimed in claim 2 wherein said inlet duct has a generally rectangular opening forming an inlet to said plenum chamber in the side wall of said intake manifold, the length of said rectangular opening being approximately half the length of said elongated intake manifold, said heating element means being positioned in the flow path of air from said rectangular opening.

5. An intake system as claimed in claim 4 wherein said engine has 6 cylinders and the heating element means extends over a portion of the length of said rectangular opening, whereby said heating element means may be used on an engine having fewer cylinders than 6.

6. An intake system as claimed in claim 3 further comprising means for mounting said heating element means to said elongated top wall.

7. An intake system as claimed in claim 6 wherein said mounting means comprises at least two threaded elements connected to said heating element means and extending through said top wall.

8. An intake system as claimed in claim 7 wherein said threaded elements are electrically connected to said heating element means and electrically insulated from said top wall.

9. An intake system for a multi-cylinder internal combustion engine, comprising an intake manifold defining a plenum chamber connectable to a plurality of engine cylinders and an intake duct opening into and supplying ambient air to the plenum chamber, and a heater comprising heating element means positioned within the plenum chamber adjacent to and in the path of at least a substantial part of the air entering the plenum chamber from the intake duct, wherein said intake duct has a rectangular inlet receiving air flow in a direction generally parallel to the elongated dimension of said intake manifold so that the air flow turns approximately 90 degrees into the intake manifold, a portion of the rectangular inlet being covered by the heating element means, said portion of the rectangular inlet being furthest from the intake duct inlet, whereby inertia directs substantially all the air over said heating element means.

10. An intake system for a multi-cylinder internal combustion engine, comprising an intake manifold defining a plenum chamber connectable to a plurality of engine cylinders and an intake duct opening into and supplying ambient air to the plenum chamber, and a heater comprising heating element means positioned within the plenum chamber adjacent to and in the path of at least a substantial part of the air entering the plenum chamber from the intake duct wherein said heater comprises upper and lower formed housings having side walls to form a generally channel shaped cross section, said formed housings having opposing mounting flanges, and positioned to form a generally rectangular opening therebetween, said heating element means comprising at least one ribbon like convoluted resistance element positioned between said housings so that air flow through said generally rectangular opening passes smoothly over the side walls of said ribbon like convoluted resistance element, and means for electrically insulating said ribbon like resistance from said upper and lower formed housings.

11. An intake system as claimed in claim 10 further comprising:

means for electrically connecting the sides of said resistance elements, said electrical connection means comprising threaded electrically conductive elements extending through the ends of said resistance element and said formed housing mounting flanges, and means for electrically insulating said threaded elements from said mounting flanges.

12. An intake system as claimed in claim 11 wherein said electrical insulating means comprises annular electrically insulating elements positioned around said threaded element and between said threaded element and said opposed flanges.

13. An intake system as claimed in claim 11 wherein said threaded elements extend through openings in said intake manifold for mounting said resistance elements and said upper and lower formed housings, said system further comprising means for electrically insulating said threaded elements from said intake manifold.

14. An intake system as claimed in claim 13 wherein said intake manifold electrically insulating means comprises tubular elements positioned over said threaded elements and between the threaded elements and said intake manifold.

* * * * *